United States Patent
Larsson et al.

(10) Patent No.: US 10,779,304 B2
(45) Date of Patent: Sep. 15, 2020

(54) NETWORK NODE AND METHOD FOR PERFORMING A TRANSMISSION TO ONE OR MORE WIRELESS DEVICES

(71) Applicant: Telefonaktiebolaget LM Ericsson (publ), Stockholm (SE)

(72) Inventors: Kjell Larsson, Luleå (SE); Maurice Bergeron, Quebec (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/464,900

(22) PCT Filed: Dec. 12, 2016

(86) PCT No.: PCT/SE2016/051244
§ 371 (c)(1),
(2) Date: May 29, 2019

(87) PCT Pub. No.: WO2018/111159
PCT Pub. Date: Jun. 21, 2018

(65) Prior Publication Data
US 2020/0100265 A1   Mar. 26, 2020

(51) Int. Cl.
*H04W 16/14* (2009.01)
*H04W 72/12* (2009.01)
(Continued)

(52) U.S. Cl.
CPC ....... *H04W 72/1215* (2013.01); *H04L 1/0003* (2013.01); *H04L 1/0009* (2013.01);
(Continued)

(58) Field of Classification Search
CPC .................................................. H04W 72/1215
(Continued)

(56) References Cited

U.S. PATENT DOCUMENTS

| 2013/0010632 | A1* | 1/2013 | Wang ........... | H04B 17/24 370/252 |
| 2014/0307645 | A1* | 10/2014 | Ji .................. | H04L 1/0003 370/329 |
| 2017/0251399 | A1* | 8/2017 | Kuusela ........ | H04L 1/1822 |

FOREIGN PATENT DOCUMENTS

| WO | 2016097880 A1 | 6/2016 |
| WO | 2016122756 A1 | 8/2016 |

OTHER PUBLICATIONS

Author Unknown, "Technical Specification Group Radio Access Network; Study on Licensed-Assisted Access to Unlicensed Spectrum; (Release 13)," Technical Report 36.889, Version 13.0.0, 3GPP Organizational Partners, Jun. 2015, 285 pages.
(Continued)

*Primary Examiner* — Joel Ajayi
(74) *Attorney, Agent, or Firm* — Patent Portfolio Builders, PLLC

(57) ABSTRACT

A network node and a method performed by the network node for performing a transmission to one or more wireless devices are provided. The network node is operable in a first communication network, supports carrier aggregation, and provides a PCell in a licensed frequency band and a SCell in an unlicensed frequency band. The method comprises determining to employ splinted Link Adaptation (LA) for a downlink transmission on the SCell; and employing a first Modulation and Coding Scheme (MCS) on one or more first subframes of a transmission burst to be transmitted to the one or more wireless device and at least a second MCS on one or more subsequent subframes of the transmission burst to be transmitted to the wireless device.

21 Claims, 7 Drawing Sheets

(51) Int. Cl.
   *H04L 1/00*      (2006.01)
   *H04L 5/00*      (2006.01)
(52) U.S. Cl.
   CPC ............ *H04L 1/0026* (2013.01); *H04L 5/001* (2013.01); *H04W 72/1273* (2013.01); *H04W 16/14* (2013.01)
(58) Field of Classification Search
   USPC ........................................................ 455/450
   See application file for complete search history.

(56) References Cited

OTHER PUBLICATIONS

Coolpad, "R1-151113: Discussion on DL reference signal transmission for LAA," Third Generation Partnership Project (3GPP), TSG RAN WG1 Ad-hoc Meeting, Mar. 24-26, 2015, 3 pages, Paris, France.

International Search Report and Written Opinion for International Patent Application No. PCT/SE2016/051244, dated Sep. 4, 2017, 13 pages.

* cited by examiner

☐ Transmitting subframe
▨ Non-transmitting subframe
■ WiFi transmission

▨ Error rate

NETWORK NODE AND METHOD FOR PERFORMING A TRANSMISSION TO ONE OR MORE WIRELESS DEVICES

This application is a 35 U.S.C. § 371 national phase filing of International Application No. PCT/SE2016/051244, filed Dec. 12, 2016, the disclosure of which is incorporated herein by reference in its entirety.

TECHNICAL FIELD

The present disclosure relates to wireless communication and in particular to a network node and a method for performing a transmission to one or more wireless devices, wherein the network node provides resources in both a licensed spectrum and an unlicensed spectrum.

BACKGROUND

A large chunk of unlicensed spectrum exists in the 2 and 5 GHz spectrum, known to be used by WiFi. However, the spectrum is unlicensed and open for other technologies. In some markets, no requirements exist for Listen-Before-Talk, LBT, to be used. In those markets a duty cycle based transmission may be used, comprising a transmission phase and a silent phase which allow technologies not relying on LBT to transmit. The duty cycled based transmission can start to transmit than someone else is transmitting. To balance the load between different system and technologies a duty cycle based system can use a Carrier-Sensing Adaptive Transmission, CSAT, to adapt the channel usage. To adapt the channel usage, other detected transmissions over a given energy level can be used; which is the Energy Detection, ED. The duty cycle based approach is used by the first LTE versions, LTE-U, operating in the unlicensed spectrum. In order to be able to operate in all markets the function called LBT is required. The usage of LBT means that the channel usage do not have to be adapted by a CSAT approach any longer, instead the system will sense the carrier before it starts to transmit; the transmission starts when it see the channel is free. In a system with mixed technologies an ED thread hold value can be used to determine when the channel is free. When this is used in LTE, it is called License Assisted Access (LAA).

Generally, network nodes try to determine which data rate to send with by some kind of feedback from the receiver. Such methods may be quality feedback, e.g. CQI, or that the network nodes probe which rate to be used. An example is Long Term Evolution, LTE, which uses CQI together with an outer loop. Another example is WiFi which generally uses probing with the only feedback of ACK if the transmission was successful.

Link adaptations, LA, may be used to predict what deviations exist in the CQI compared to the real channel performance of a wireless device, i.e. bases on errors in the transmitted subframes the used MCS can be changed a little based on what was predicted by the CQI.

If LBT is used, other more advanced methods may be used by users to reserve the channel by sending a reservation. WiFi does this with Clear-To-Send, CTS, but this method doesn't work well between different technologies, since the use of unlicensed spectrum can't force a technology to decode what other technologies send.

When only one technology exists in a spectrum it can be designed to time-share the spectrum between users such as WiFi is doing or it can be designed to operate well in an environment with high interference such as WDCMA or LTE. Mixing the two may be somewhat problematic.

In LTE-U (Long Term Evolution Unlicensed) only the downlink is transmitted on the carrier(s) in the unlicensed spectrum while both uplink and downlink are transmitted on the carrier(s) in the licensed spectrum. In LAA either only downlink is or a combination of downlink and uplink are transmitted on the unlicensed spectrum. The carrier(s) in the unlicensed spectrum is called Secondary Cell, SCell, and to a large extent works as it is carrier aggregated with the carrier in the licensed spectrum, Primary Cell, PCell.

LTE is designed to operate with the same frequency in all cells. A cell is the coverage area of a network node. A network node may be associated with more than one cell. However, WiFi prefer to use a sparser frequency reuse since it wants as few strong interferes as possible to get less users to time share the channel with.

When both WiFi and unlicensed LTE are deployed, co-sited or not, WiFi can cause strong interference at the wireless device in bursts which cause problems when LTE-U initiate transmissions without using LBT.

LTE-U is using the channel in a CSAT manner. Meaning that a network node transmits in duty cycles where it transmits for X out of Y subframes. In LTE-U the duty cycle may be 20 subframes (1 subframe is 1 ms) and the network node typically may transmit in between 2-18 of those subframes. In the period the network node is not transmitting it evaluate the carrier and determines how much load (over a given energy level) it is on the carrier from other users. If the load is over a given level the network node may decrease the channel usage and if it is under a given level it may increase the channel usage.

When LBT not is used it exist a risk that a new transmission from a device or node of the LTE-U communication network starts when another node already is transmitting. This may result in the first subframe(s) to be sent meanwhile another transmission already is on-going from another node with strong power and it causes interference. It is first when the already ongoing WiFi interference stops that WiFi does a new clear channel assessment and detects it should not start a new transmission.

SUMMARY

The object is to obviate at least some of the problems outlined above. In particular, it is an object to provide a network node and a method performed thereby for performing a transmission to one or more wireless devices. These objects and others may be obtained by providing a network node and a method performed by a network node according to the independent claims attached below.

According to an aspect, a method performed by a network node for performing a transmission to one or more wireless devices is provided. The network node is operable in a first communication network, supports carrier aggregation, and provides a Primary Cell, PCell, in a licensed frequency band and a Secondary, SCell, in an unlicensed frequency band. The method comprises determining to employ splinted Link Adaptation, LA, for a downlink transmission on the SCell; and employing a first Modulation and Coding Scheme, MCS, on one or more first subframes of a transmission burst to be transmitted to the one or more wireless devices and at least a second MCS on one or more subsequent subframes of the transmission burst to be transmitted to the wireless device(s).

According to an aspect, a network node for performing a transmission to one or more wireless devices is provided.

The network node is operable in a first communication network, supports carrier aggregation, and provides a Primary Cell, PCell, in a licensed frequency band and a Secondary Cell, SCell, in an unlicensed frequency band. The network node is configured for determining to employ splinted Link Adaptation, LA, for a downlink transmission on the SCell; and employing a first Modulation and Coding Scheme, MCS, on one or more first subframes of a transmission burst to be transmitted to the one or more wireless device(s) and at least a second MCS on one or more subsequent subframes of the transmission burst to be transmitted to the wireless device(s).

The network node and the method performed by the network node have several advantages. One possible advantage is that throughput may be increased as well as capacity of the system and/or network node. Higher throughput might also enable new services, even if no guarantees on the provided throughput can be given, when the operation take place in unlicensed spectrum. Still another possible advantage is that a more aggressive average MCS may be used, wherein less overhead is needed in order to successfully transmit a given amount of data. A further advantage due to less overhead and shorter completion time is that the system may switch to low power mode for longer time and save energy once the transmission is completed. A further possible advantage is that other users in the unlicensed spectrum are helped since they may be able to complete their transmissions faster and hence leave the channel free to other users.

BRIEF DESCRIPTION OF DRAWINGS

Embodiments will now be described in more detail in relation to the accompanying drawings, in which.

DETAILED DESCRIPTION

Briefly described, a network node and a method performed thereby for performing a transmission to one or more wireless devices are provided. Based on the assumption that one or more first subframes of a transmission burst are more likely to suffer from interference caused by other nodes and/or devices operating on the unlicensed frequency band, the network node may take measures in order to increase the probability of successful reception at the wireless device(s) of the data transmitted on subframes of the transmission burst. The network node may transmit dummy data or dummy symbols in the one or more first subframes, the network node may employ different Modulation and Coding Schemes, MCSs, for different subframes of the transmission burst as a couple of examples of measures for the network node to take, in order to increase the probability of successful reception at the wireless device(s).

Embodiments herein relate to a method performed by a network node for performing a transmission to one or more wireless devices. The network node is operable in a first communication network, supports carrier aggregation, and provides a PCell in a licensed frequency band and a SCell in an unlicensed frequency band.

Figure 1A:
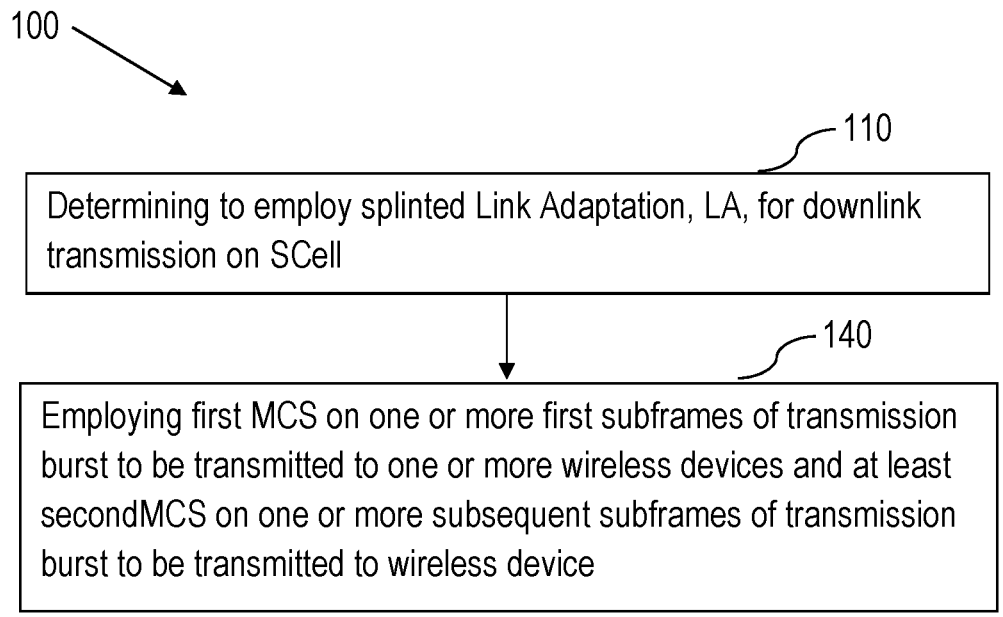
FIG. 1a is a flowchart of a method performed by a network node for performing a transmission to one or more wireless devices, according to an exemplifying embodiment.

Embodiments of such a method will now be described with reference to FIGS. 1a-1e. FIG. 1a illustrates the method comprising determining 110 to employ splinted Link Adaptation, LA, for a downlink transmission on the SCell; and employing 140 a first Modulation and Coding Scheme, MCS, on one or more first subframes of a transmission burst to be transmitted to the one or more wireless device and at least a second MCS on one or more subsequent subframes of the transmission burst to be transmitted to the wireless device.

The network node is communicating with the wireless device by means of the PCell (primary carrier) and at least one SCell (secondary carrier). Generally, control signalling is always transmitted on the PCell and downlink data may be transmitted on both the PCell and the SCell(s). The unlicensed frequency band may be e.g. in the 2 GHz and/or the 5 GHz spectrum, thereby competing with e.g. WiFi. In the licensed spectrum, also referred to as licensed frequency band, the communication network may be in more control of possible interference due to other transmissions within a cell and/or neighbouring network nodes belonging to the own communication network. The network node may be associated with one or more cells being a coverage area of the network node. However, in the unlicensed spectrum, many other wireless devices and/or communication devices may generate a lot of traffic in the form of transmissions to and from those other wireless devices and/or communication devices. These transmissions may cause interference in the SCell to transmissions between the network node and the wireless device(s) over the SCell. The interference may thus affect the channel quality for the SCell.

When the network node wants to perform a transmission to one or more wireless devices, the network node may first determine whether to employ splinted LA for the downlink transmission on the SCell or not. The reasons for employing splinted LA may be that the network node detects that there is a lot of traffic on-going in the unlicensed frequency band in which the SCell operates. Merely as an example, in case the network node determines that there is a certain amount of interference on the SCell, e.g. in the CQI, and/or the SINR, uneven Block Error Rate, BLER, between subframes and/or any other parameter indicative of channel quality and/or interference does not meet a respective threshold, the network node may determine to employ splinted LA for the downlink transmission on the SCell.

Once the network node has determined to employ splinted LA for the downlink transmission on the SCell, the network node employs the first MCS on one or more first subframes of a transmission burst to be transmitted to the one or more wireless device and at least a second MCS on one or more subsequent subframes of the transmission burst to be transmitted to the wireless device. In theory, the network node may use as many as one MCS per subframe in the transmission burst. Thus, the network node may use between minimum two MCS and the maximum number of MCS corresponding to the number of subframes in the duty cycle or transmission burst. The method hence contain several instances that pick MCS according to different rules for the different subframes, the different instances might and up to select the same MCS.

A transmission burst may comprise a plurality of subframes. In LTE a frame is 10 ms and a subframe is 1 ms. In LTE-U SCell employs duty cycles, which e.g. may be 20 ms containing an ON and OFF period. The ON period contains a number of subframes, which may comprise 2-18 subframes.

Consequently, the network node may employ the first MCS, associated with a first MCS index, on at least one first subframe of the transmission burst to be transmitted to the one or more wireless device(s). The network node may then employ at least the second MCS, associated with a second MCS index, on one or more subsequent subframes of the transmission burst to be transmitted to the wireless device(s).

In an illustrative and non-limiting example, assume the transmission burst comprises 12 subframes, wherein the network node employs the first MCS, associated with the first MCS index, on the first two subframes, the second MCS, associated with the second MCS index, on the subsequent three subframes, and a third MCS associated with a third MCS on the remaining subsequent seven subframes.

Assuming that there is many devices and/or nodes transmitting on frequencies causing interference on the SCell, the interference may be stronger for the first subframes. However, during the first part of the transmission burst, corresponding to the first subframe(s), the WiFi—devices/nodes may already be transmitting when the network node starts the transmission burst and hence the first subframes may experience more severe interference than the subsequent ones. It is first when devices and/or nodes belonging to the unlicensed spectrum, e.g. WiFi devices/nodes, are ready to start a new transmission burst that they discover the channel is busy from the LBT procedure and hence will not start a new transmission. Consequently, by employing different MCS for the first subframe(s) than for the subsequent subframes, there is an increased chance that the data in the first subframes are not lost. Also, by splitting the MCS selection eventual BLER on the one or more first subframes will not affect the outer loop in the LA for the remaining subframes.

It shall be pointed out that in this disclosure, when stating employing an MCS on one or more subframes, it means that an MCS selection process or instance. If for example "one or more subsequent subframes" is 15 subframes, a new CQI might arrive after e.g. 10 subframes and the used MCS may be changed at once. Also the link adaptation algorithm will see ACK/NACK and based on this, the LA might adjust the MCS during the burst, for example on subframe 9 and 14.

The method performed by the network node has several advantages. One possible advantage is that throughput may be increased as well as capacity of the system and/or network node. Higher throughput might also enable new services, even if no guaranties on the provided throughput can be given. Still another possible advantage is that a more aggressive average MCS may be used, wherein less overhead is needed in order to successfully transmit a given amount of data. A further advantage due to less overhead and shorter completion time is that the system may switch to low power mode for longer time and save energy once the transmission is completed. A further possible advantage is that other users in the unlicensed spectrum are helped since they may be able to complete their transmissions faster and hence leave the channel free to other users.

The MCS of the one or more first subframes of the transmission burst may be associated with a lower MCS index than the MCS of the one or more subsequent subframes of the transmission burst.

Different MCS are associated with different MCS, wherein individual MCS indices represent individual MCSs. Generally, the lower the MCS index, the lower is the offered link level throughput. If a too high MCS is selected the Block error rate will be too high and the end user throughput will drop. Hence a less aggressive MCS, lower MCS, can provide better performance.

Consequently, by having the one or more first subframes modulated and coding with an MCS associated with a lower MCS index, the more likely it is that the first subframe(s) may be successfully received by the wireless device(s) even if the first subframe(s) suffer from higher interference.

Another important aspect of separating the first and second MCS is that this will ensure that the second MCS may be kept high, or be more aggressive, compared to if only one MCS should be selected based on all subframes. The reason for this is that block error rate is a common target for how MCS should be selected.

Figure 1B:
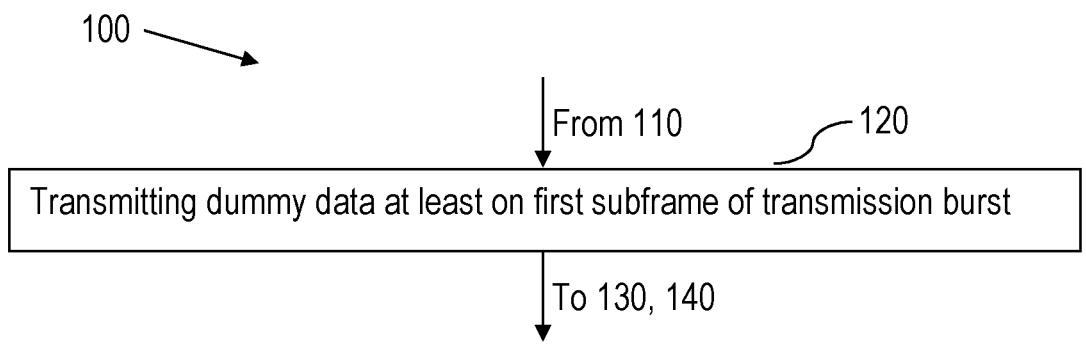
FIG. 1b is a flowchart of a method performed by a network node for performing a transmission to one or more wireless devices, according to yet an exemplifying embodiment.

The method may further comprise, as illustrated in FIG. 1b, transmitting 120 dummy data at least on the first subframe of the transmission burst.

Dummy data may be transmitted at least on the first subframe when the network node does not expect the wireless device(s) to be able to decode the data in at least the first subframe. Then the MCS of the subframes carrying dummy data may be "zero" meaning introducing a new MCS index that indicates that the at least first, i.e. the one or more first, subframe should not even be encoded since it may be a waste of resources if no user/receiver (wireless device) is expected to be able to decode the data in the one or more first subframes. Another way to transmit dummy data at least on the first subframe may be to transmit some "dummy" data not addressed to any wireless device, i.e. no user has received a scheduling notification that the subframe belong to them.

However, it shall be pointed out that the dummy data may be subjected to an MCS associated with an MCS index even if it is not necessary.

Figure 1C:
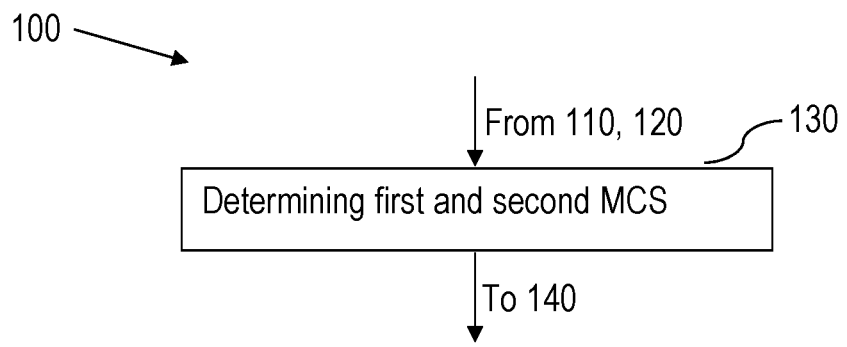
FIG. 1c is a flowchart of a method performed by a network node for performing a transmission to one or more wireless devices, according to still an exemplifying embodiment.
Figure 1D:
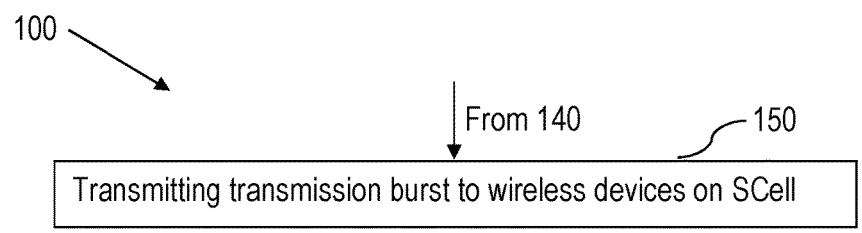
FIG. 1d is a flowchart of a method performed by a network node for performing a transmission to one or more wireless devices, according to another exemplifying embodiment.

The method may further comprise, as illustrated in FIG. 1c, determining 130 the first and the second MCS.

As stated above, there may be more than two MCSs per transmission burst. The network node may have to determine which MCSs to be used, i.e. at least the first and the second MCS. As described above, the network node may employ more than two MCSs on the subframes of the transmission burst and the network node may then need to determine each of the MCSs to employ on the subframes of the transmission burst.

There are different ways to determine the first and the second MCS. The determining 130 of the first and the second MCS may comprise the first MCS being fixed; and determining the second MCS based on an Outer Loop for the one or more subsequent subframes of the transmission burst and based on a reported channel quality.

In this first example, the network node may receive Channel Quality Indicator, CQI, reports from the wireless device(s). The CQI is reported periodically and there may be several subframes between each report. As an illustrative and non-limiting example, one CQI may be sent each 80 ms, in this time period 4 duty cycles (assuming 20 ms duty cycle) passes. Hence 4 bursts of consecutive transmissions will take place between each CQI.

An Outer Loop Link Adaptation, OLLA algorithm may be used to adaptively modify the mapping between CQI and MCS. The CQI is basically translated to a Signal to Interference and Noise and Ratio, SINR, which is used to look up which MCS to be used. OLLA basically modifies this SINR value, which was based on the CQI, by calculating an offset and applying the offset. The offset is based on ACKs and NACKs for transmitted subframes in order to adjust the average block error rate (BLER) to a target.

Consequently, the first MCS is fixed in the example above and at least second MCS is dynamically determined based on CQI and OLLA.

In another example, the determining 130 the first and the second MCS comprises determining the second MCS based on an Outer Loop for the one or more subsequent subframes of the transmission burst and based on a reported channel quality; and determining the first MCS based on an offset to the second MCS.

In this second example, the at least second MCS (or the last if possible third, fourth etc., MCS are used) is based on CQI and OLLA. In this manner, just as above, the at least second MCS (or the last if possible third, fourth etc., are used) is determined in accordance with the current channel quality and conditions so that the determined MCS is as optimal as possible for the current channel quality and conditions whereby just enough MCS is selected for the data in relevant subframes in order for the wireless device(s) to successfully receive and decode the data in the subframes of the transmission burst.

The first MCS (or first MCSs, if more than two MCSs are used) may then be determined based on an offset to the second MCS (or last MCSs, if more than two MCSs are used). The offset may be an integer that is added to the MCS index of the second MCS. The offset may be a value that is added to the measured SINR, which is then used in order to determine the first MCS. In an example, assume there are three different MCSs, the first MCS, MCS_1, the second MCS, MCS_2 and a third MCS, MCS_3. Then MCS_3 may be determined based on the "last" subframes (subframes associated with MCS_3), ACK(s)/NACK(s), and reported CQI. The MCS_2 may be determined based on MCS_3— offset1, wherein offset1 is based on ACK(s)/NACK(s) for subframes associated with MCS_2. The MCS_1 may then be determined based on MCS_3—offset2, wherein offset2 is based on ACK(s)/NACK(s) for the first subframes (subframes associated with MCS_1).

The offset may be determined by an Outer Loop for the at least one first subframes of the transmission burst.

There are various ways also to determine the offset. But the aim is to be able to find an offset such as also the BLER on the at least one first subframes also meet a BLER target. For example, the offset may be determined by the Outer Loop operating on the at least one first subframes of the transmission burst. The offset may be an integer that is added to the MCS index of the second MCS. The offset may be a value that is added to the measured SINR, which is then used in order to determine the first MCS. In this way the overall channel quality will be tracked by the OLLA for the second MCS and the level of extra interference will be tracked by the OL operating on at least one first subframe of the transmission burst.

Figure 2A:
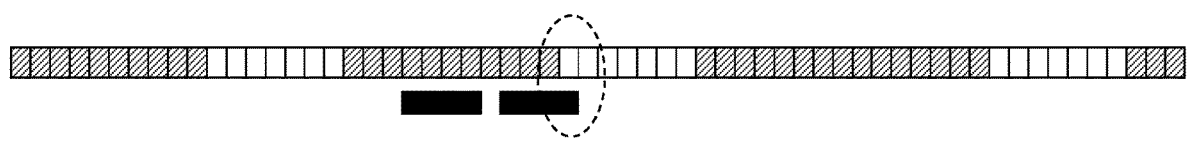
FIG. 2a is a schematic illustration of an example with coexistence with LTE-U and WiFi.
Figure 2B:
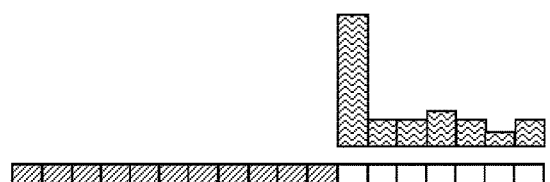
FIG. 2b is a schematic illustration of a possible error rate on different subframes.
Figure 2C:
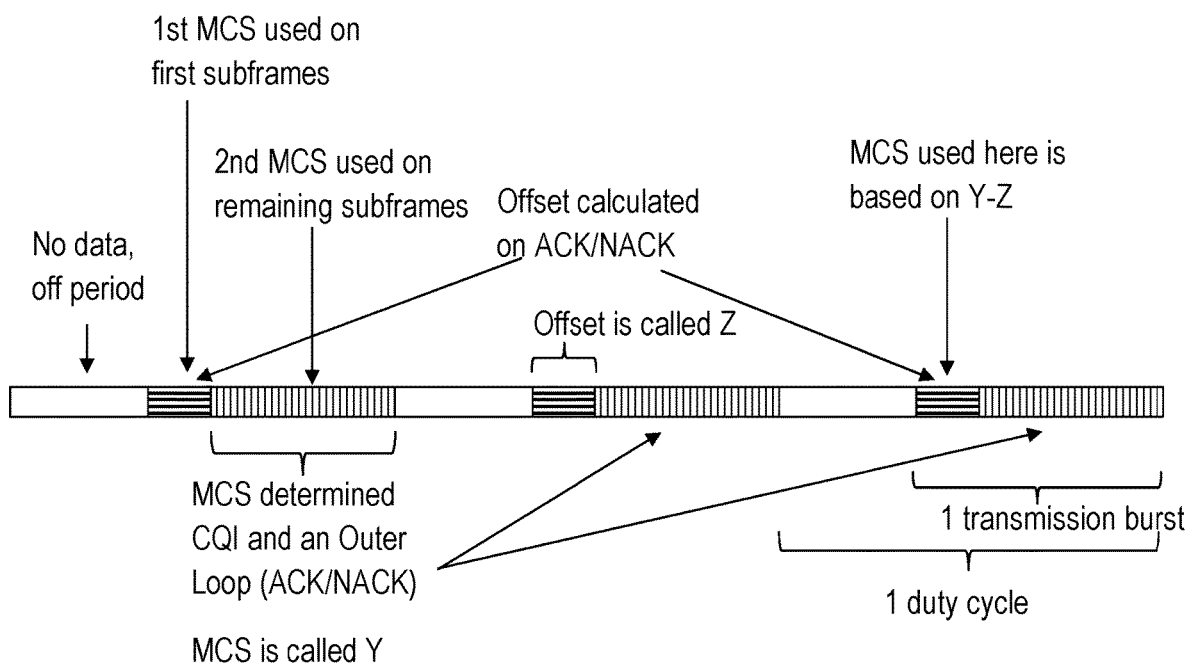
FIG. 2c is an illustration of transmission bursts wherein different MCSs are employed for different subframes of the transmission bursts.

FIG. 2c is an illustration of transmission bursts showing 3 duty cycles, which means that there are 3 transmission bursts in this exemplifying illustration. In the illustration each duty cycle starts with the non-transmitting subframe. The one or more first subframes of the transmission burst employs MCS_1 and the on one or more subsequent subframes employs MCS_2. The MCS_2 is, which is the one used for the one or more last subframes, based on channel quality feedback; CQI and an outer loop operating on ACKs/NACKs. In FIG. 2c the MCS_2 is called "Y". To be able to determine MCS_1 also an offset1, called "Z" in FIG. 2c, needs to be determined. The offset can either be fixed or determined based on the ACKs/NACKs for the one or more subframes which are associated with MCS_1. Hence the MCS_1 is determined by "Y-Z" as illustrated on the figure. Since the number of subframes using MCS_1 and are used to determine offset1 can be rather low it might be first in the next duty cycle any changes to offset might impact the used MCS.

Alternatively, the offset may be fixed.

With a fixed offset, the network node may only need to add or subtract the fixed offset to/from the SNR associated with the second MCS.

There is no need for the network node to perform any calculations in order to determine the offset in order to determine the first MCS.

Generally, an operator may determine the fixed offset upon implementation. The offset may be determined e.g. based on simulation studies to find the best strategy. But in different cases the best value may differ. It has to do with the location of the nodes/devices and hence the interference level may differ a lot. If it is desirable to be ascertain to get some data through on first subframe it might be necessary to use a very low MCS, but it is possible to gamble a bit and use a moderately high and get data through with higher BLER. They are all implementation choices for the operator.

The determining 130 of the first and the second MCS may comprise determining the first MCS based on an Outer Loop for the one or more first subframes of the transmission burst and based on a reported channel quality; and determining the second MCS based on an Outer Loop for the on one or more subsequent subframes of the transmission burst and based on a reported channel quality.

In order to determine the first and second MCS, and potentially further MCSs analogously, the network node may employ a first Outer Loop or OLLA to the one or more first subframes of the transmission burst for which the first MCS is to be employed and a second Outer Loop or OLLA to the one or more subsequent subframes of the transmission burst for which the second MCS is to be employed. Consequently, when determining the first MCS, the network node bases determining the first MCS on the first Outer Loop or OLLA together with the reported channel quality for the SCell. Analogously, when determining the second MCS, the network node bases determining the second MCS on the second Outer Loop or OLLA together with the reported channel quality for the SCell.

In this example, both the first and the at least second MCS may both be determined dynamically.

The channel quality may be represented by a Channel Quality Indicator, CQI.

There are different quality parameters that may be used to represent or reflect the channel quality. One example is the CQI. It is an indicator carrying the information on how good/bad the communication channel quality is. CQI is determined by the wireless device(s), which the wireless device(s) send(s) to the network node.

There are two types of CQI report: periodic and aperiodic. The periodic CQI report is carried by the Physical Uplink Control Channel, PUCCH. But if the wireless device needs to send uplink data in the same subframe as the scheduled periodic CQI report, the periodic CQI report will use the Physical Uplink Shared Channel, PUSCH, together with uplink data transmission.

Consequently, the CQI is a good parameter to use for representing the channel quality.

The method may further comprise transmitting 150 the transmission burst to the wireless device(s) on the SCell.

Once the network node has determined the first and the at least second MCS to employ for the transmission, the network node may transmit the transmission burst to the wireless device(s). Different wireless devices may be listening for different subframes and more than one wireless device may be listening for the same subframe or subframes. If data is transmitted to several users each receiving user will have a first and second MCS, since the MCS is determined per user.

By employing the at least two different MCSs for at least two parts of the transmission burst, the network node may increase the possibility that the data transmitted in the subframes are successfully received by the one or more wireless devices and that as little resources are wasted on modulation and coding where they may be of little use. This means that each part of the transmission burst may be used efficiently with MCSs tailored for good performance in each subframe.

FIG. 2a is a schematic illustration of an example with coexistence with LTE-U and WiFi, wherein there might be higher interference on the first subframe(s).

When LBT not is used there is a risk that a new transmission from a network node in LTE-U starts when another node in e.g. WiFi already is transmitting. This causes the first subframe(s) to be sent meanwhile another transmission already is on-going from the other node with strong power and it causes interference. It is first when the already ongoing WiFi interference stops that the device or node in the WiFi communication network does a new Clear Channel Assessment (CCA) and detects that it should not start a new transmission. This results in that the interference on the different subframes may differ a lot and the error characteristics may differ a lot between the different subframes and if one and the same link adaptation (LA) is used for all subframes the performance may be suboptimal. The LA here may use an Outer Loop (OL) control, also known as OLLA.

The same issue with that first subframes might exist even if LBT is used if it is a mix between system using a fixed time grid or not, e.g. for Licensed Assisted Access, LAA, where transmissions needs to start at the beginning of the subframe but LBT might take some time to give permission to send. Sending most of the burst may be enough to decode the data correctly but the error rate is higher.

FIG. 2b is a schematic illustration of a possible error rate on different subframes. In FIG. 2b, it is illustrated an example in which the first subframe suffer a higher error rate than the subsequent subframe. However, it is pointed out that FIG. 2b is merely an illustrative example and also the second and third subframe for example may suffer higher error rate than subsequent subframes.

As LTE-U works, it may use fewer subframes when the network "sees" someone else, e.g. WiFi using the same channel in the unlicensed spectrum and if WiFi is sending a lot of data the risk of collision increases since WiFi link level tries to fill the channel as much as possible as long as data exists for transmission.

This might result in that in average a too low MCS is used and hence the throughput is lower than necessary, causing longer download times which in turn keeps the channel busy longer and hence impact other nodes with interference for a longer time which may degrade the overall performance of the different communication networks in the area.

However, using the splinted LA as describe above may alleviate such problems. Overall higher MCS may be used while keeping the error rate low, which will result in better end user throughput and therefore also better system capacity.

Figure 3A:
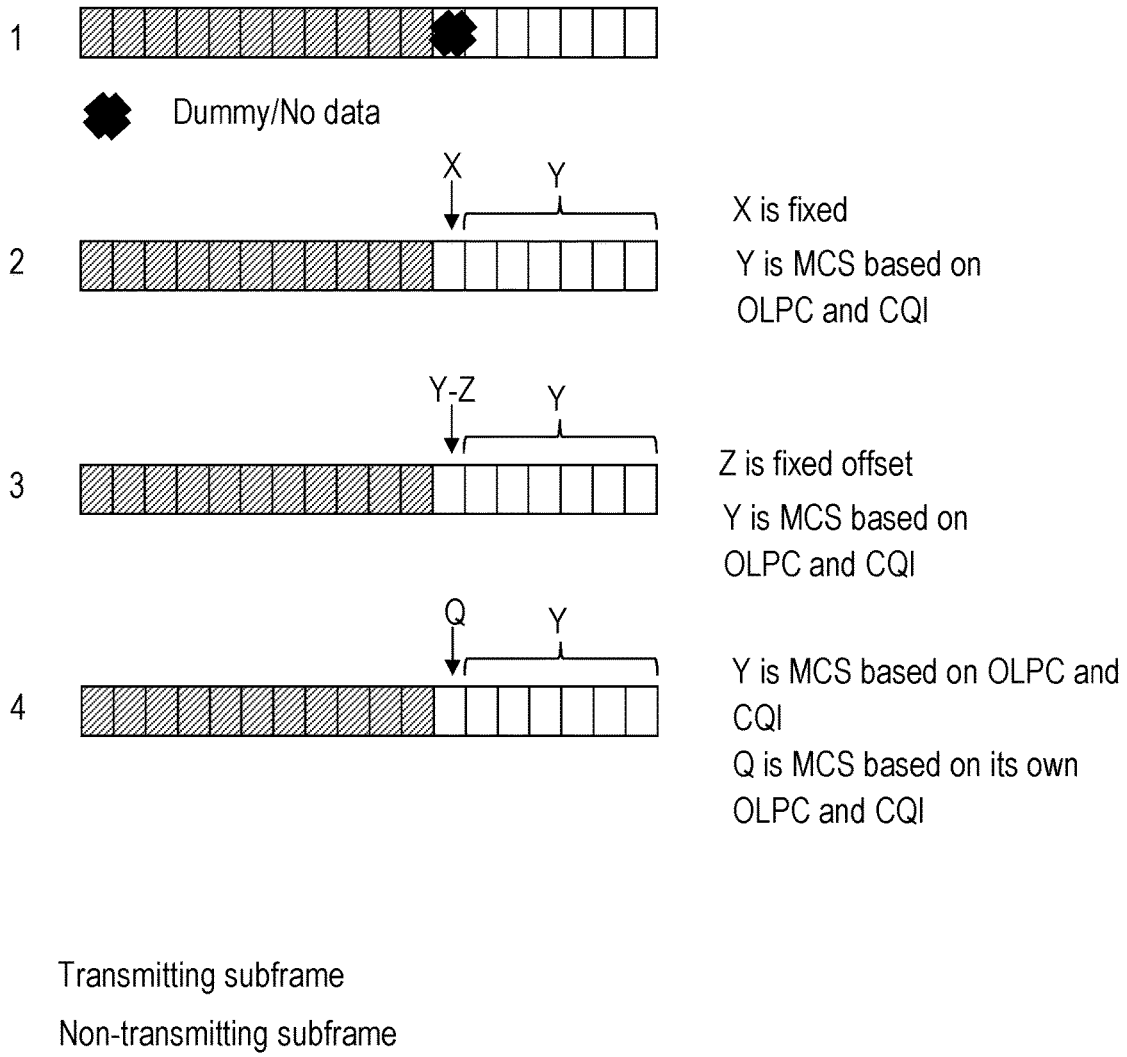
FIG. 3a is a schematic illustration of different actions for the network node to take to deal with problems arising from LTE-U coexisting with WiFi.
Figure 3B:
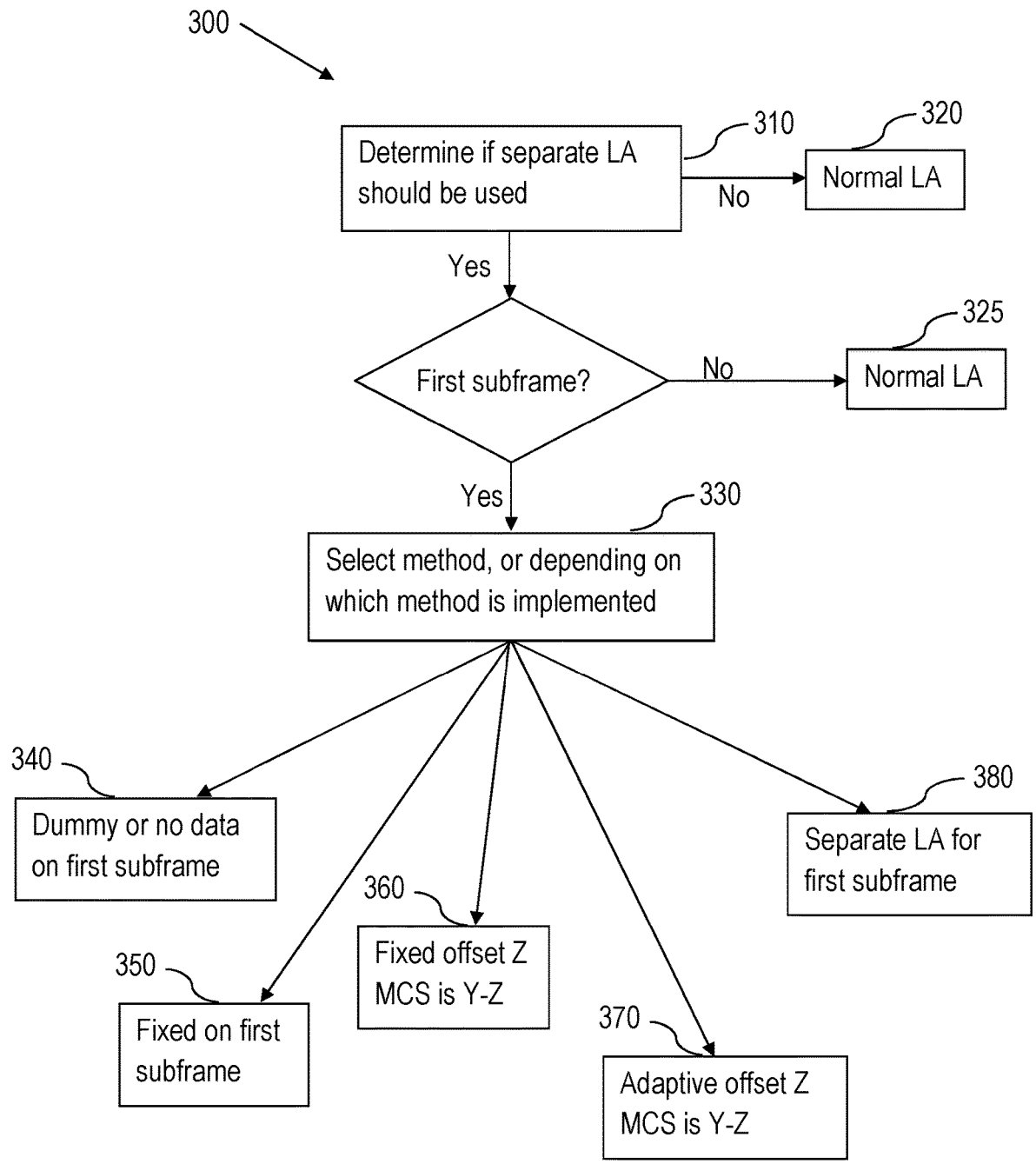
FIG. 3b is an illustrative flowchart of the method performed by the network node in an exemplifying embodiment.

FIG. 3a is an illustrative flowchart of the method performed by the network node in an exemplifying embodiment.

The solution described herein may be used all the time, but the benefits are likely to be low unless high traffic is expected from other users (nodes and/or devices), e.g. WiFi traffic. Hence it may be beneficial to detect if the other traffic is higher than e.g. a given offset (one example is be that LTE-U Carrier Sensing Adaptive Transmission, CSAT, has backed off as much as it can). Another way is to detect uneven error rate on different subframes.

When the network node has determined 310 to employ splinted LA, the network node may employ the splinted LA in different ways. For all of the below ones the normal outer loop is not considering what is happening on the first subframe:

340: Send a dummy symbol on first subframe. It will disable it from the OL, hence higher MCS may be used on remaining subframes but it's a cost of losing one subframe.

350: The first one or more subframes use a fixed MCS that generally is rather low to ensure that the transmission has a low error rate. (Low code rate means more redundancy) and a high MCS index means a high MCS having relatively high code rate (less redundancy). The first subframe still has some use, especially if the interference is not too high

360: Using a MCS which are X (X being an integer corresponding to how the MCS index should be changed) smaller than the one used on the other subframes. If the interference is not too strong it may result in a rather good usage of the first subframe while the error rate is reasonable.

370: Same as 360, using a MCS which are X smaller than the one(s) used on the other subframes. But here the X is changed based on the Outer Loop that changed its value based on the error rate on the first subframe.

380: At least two separate OL are used for the first subframe and the remaining subframes.

Embodiments herein also relate to a network node for performing a transmission to one or more wireless devices. Exemplifying embodiments of such a network node will now be described with reference to FIGS. 4 and 5. The network node, supports carrier aggregation, and is operable in a first communication network and provides a PCell in a licensed frequency band and a SCell in an unlicensed frequency band. In this disclosure, a PCell may also be referred to as a primary carrier and a SCell may be referred to as a secondary carrier.

Figure 4:
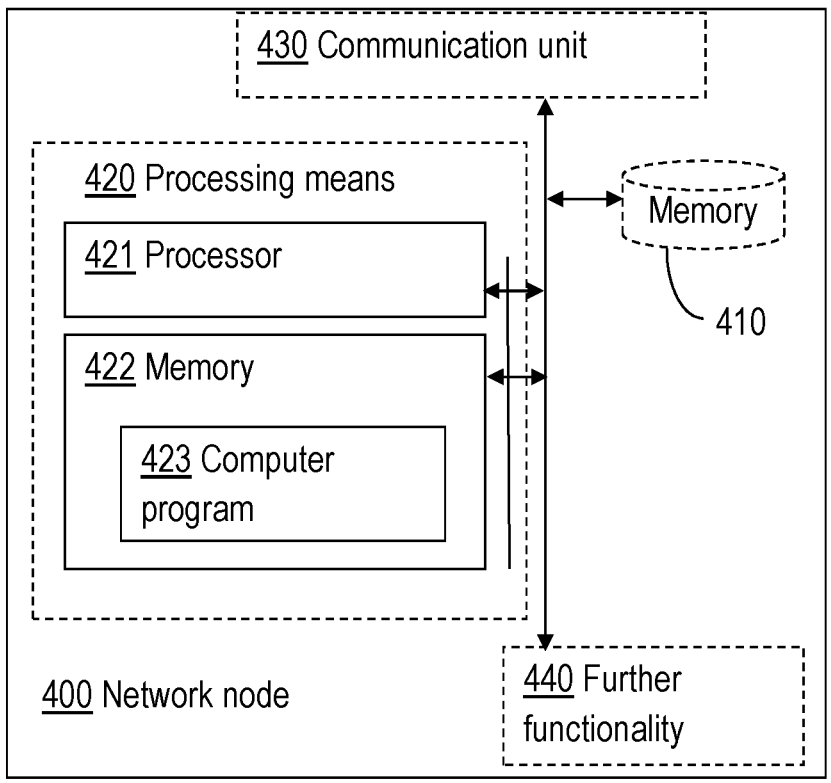
FIG. 4 is a block diagram of a network node for performing a transmission to one or more wireless devices, according to an exemplifying embodiment.
Figure 5:
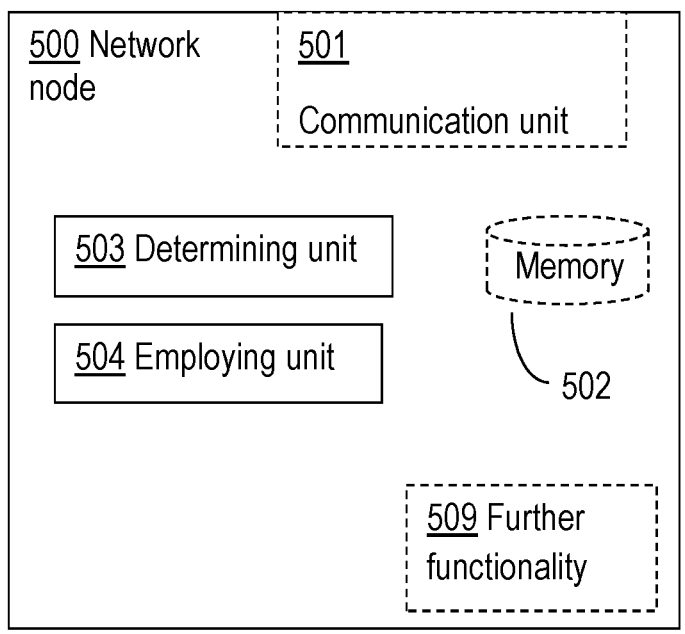
FIG. 5 is a block diagram of a network node for performing a transmission to one or more wireless devices, according to yet an exemplifying embodiment.

FIGS. 4 and 5 illustrate the network node 400, 500 being configured for determining to employ splinted Link Adaptation, LA, for a downlink transmission on the SCell; and employing a first MCS on one or more first subframes of a transmission burst to be transmitted to the one or more wireless device and at least a second MCS on one or more subsequent subframes of the transmission burst to be transmitted to the wireless device.

The network node 400, 500 may be implemented or realised in different ways. An exemplifying implementation is illustrated in FIG. 4. FIG. 4 illustrates the network node 400 comprising a processor 421 and memory 422, the memory comprising instructions, e.g. by means of a computer program 423, which when executed by the processor 421 causes the network node 400 to determine to employ splinted LA for a downlink transmission on the SCell; and to employ a first MCS on one or more first subframes of a transmission burst to be transmitted to the one or more wireless device and at least a second MCS on one or more subsequent subframes of the transmission burst to be transmitted to the wireless device.

FIG. 4 also illustrates the network node 400 comprising a memory 410. It shall be pointed out that FIG. 4 is merely an exemplifying illustration and memory 410 may optionally, be a part of the memory 422 or be a further memory of the network node 400 operable in a communication network. The memory may for example comprise information relating to the network node 400, to statistics of operation of the network node 400, just to give a couple of illustrating examples. FIG. 4 further illustrates the network node 400 comprising processing means 420, which comprises the memory 422 and the processor 421. Still further, FIG. 4 illustrates the network node 400 comprising a communication unit 430. The communication unit 430 may comprise an interface through which the network node 400 communicates with other nodes, servers, wireless devices or entities of the communication network. FIG. 4 also illustrates the network node 400 comprising further functionality 440. The further functionality 440 may comprise hardware of software necessary for the network node4 to perform different tasks that are not disclosed herein.

An alternative exemplifying implementation of the network node 400, 500 is illustrated in FIG. 5. FIG. 5 illustrates the network node 500 comprising a determining unit 503 for determining to employ splinted LA for a downlink transmission on the SCell. FIG. 5 also illustrates the network node 500 comprising an employing unit 504 for employing a first MCS on one or more first subframes of a transmission burst to be transmitted to the one or more wireless device and at least a second MCS on one or more subsequent subframes of the transmission burst to be transmitted to the wireless device.

In FIG. 5, the network node 500 operable in a communication network is also illustrated comprising a communication unit 501. Through this unit, the network node 500 is adapted to communicate with other nodes and/or entities in the communication network. The communication unit 501 may comprise more than one receiving arrangement. For example, the communication unit may be connected to both a wire and an antenna, by means of which the network node 500 is enabled to communicate with other nodes and/or entities in the communication network. Similarly, the communication unit 501 may comprise more than one transmitting arrangement, which in turn are connected to both a wire and an antenna, by means of which the network node 500 is enabled to communicate with other nodes and/or entities in the communication network. The network node 500 further comprises a memory 502 for storing data. Further, the network node 500 may comprise a control or processing unit (not shown) which in turn is connected to the different units 503-504. It shall be pointed out that this is merely an illustrative example and the network node 500 may comprise more, less or other units or modules which execute the functions of the network node 500 in the same manner as the units illustrated in FIG. 5.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method steps in the network node 500. The instructions executable by the computing system and stored on the computer-readable medium perform the method steps of the network node 500 as set forth in the claims.

The network node has the same possible advantages as the method performed by the network node. One possible advantage is that throughput may be increased as well as capacity of the system and/or network node. Higher throughput might also enable new services, even if no guaranties on the provided throughput can be given. Still another possible advantage is that a more aggressive average MCS may be used, wherein less overhead is needed in order to successfully transmit a given amount of data. A further advantage due to less overhead and shorter completion time is that the system may switch to low power mode for longer time and save energy once the transmission is completed. A further possible advantage is that other users in the unlicensed spectrum are helped since they may be able to complete their transmissions faster and hence leave the channel free to other users.

According to an embodiment, the MCS of the one or more first subframes of the transmission burst is associated with a lower MCS index than the MCS of the one or more subsequent subframes of the transmission burst.

According to yet an embodiment, the network node 400, 500 is further configured for transmitting dummy data at least on the first subframe of the transmission burst.

According to still an embodiment, the network node 400, 500 is further configured for determining the first and the second MCS.

According to a further embodiment, determining the first and the second MCS by the first MCS being fixed; and determining the second MCS based on an Outer Loop for the one or more subsequent subframes of the transmission burst and based on a reported channel quality.

According to another embodiment, determining the first and the second MCS by determining the second MCS based on an Outer Loop for the one or more subsequent subframes of the transmission burst and based on a reported channel quality; and determining the first MCS based on an offset to the second MCS.

According to an embodiment, the offset is being determined by an Outer Loop for the at least one first subframes of the transmission burst.

According to another embodiment, the offset is fixed.

According to yet an embodiment, the network node 400, 500 is further configured for determining the first and the second MCS by determining the first MCS based on an Outer Loop for the one or more first subframes of the transmission burst and based on a reported channel quality; and determining the second MCS based on an Outer Loop for the on one or more subsequent subframes of the transmission burst and based on a reported channel quality.

According to still an embodiment, the channel quality is represented by a CQI.

According to a further embodiment, the network node 400, 500 is further configured for transmitting the transmission burst to the wireless devices on the SCell.

Figure 6:
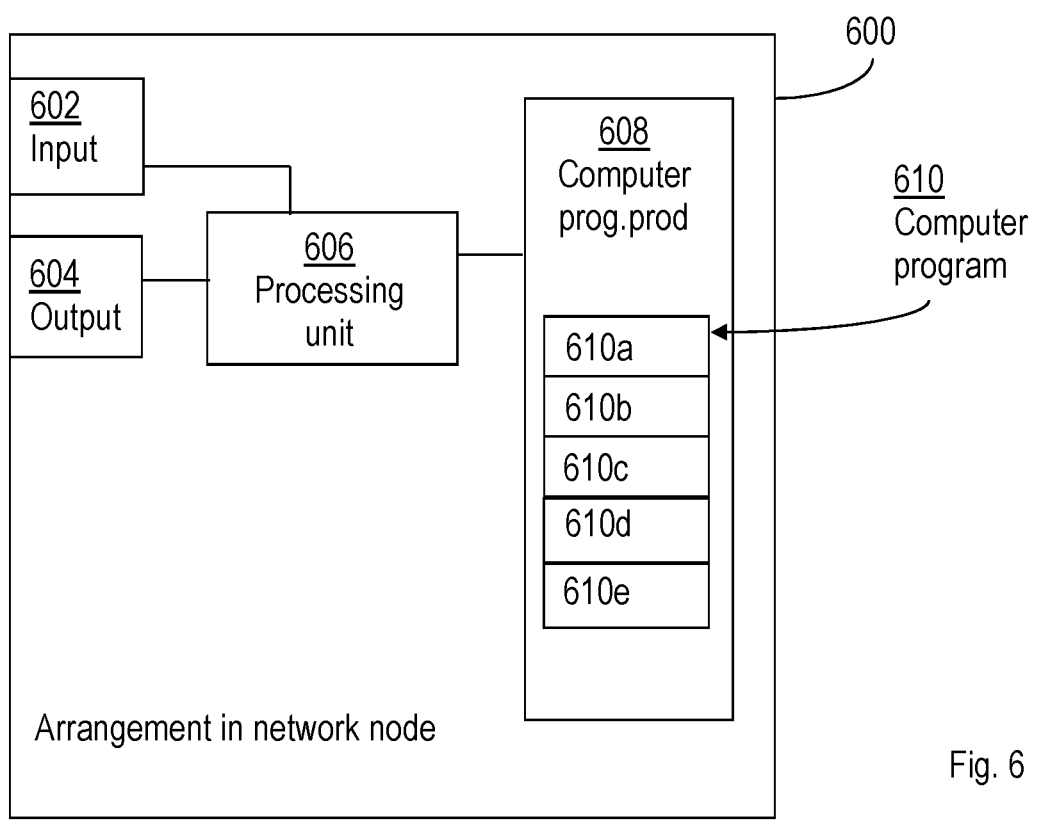
FIG. 6 is a block diagram of an arrangement in a network node for performing a transmission to one or more wireless devices, according to an exemplifying embodiment.

FIG. 6 schematically shows an embodiment of an arrangement 600 in a network node 500 operable in a first communication network. Comprised in the arrangement 600 in the network node 500 are here a processing unit 606, e.g. with a DSP. The processing unit 606 may be a single unit or a plurality of units to perform different actions of procedures described herein. The arrangement 600 in the network node 500 may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces 501.

Furthermore, the arrangement 600 in the network node 500 comprises at least one computer program product 608 in the form of a non-volatile memory, e.g. an EEPROM, a flash memory and a hard drive. The computer program product 608 comprises a computer program 610, which comprises code means, which when executed in the processing unit 606 in the arrangement 600 in the network node 500 in the communication network causes the network node 500 to perform the actions e.g. of the procedure described earlier in conjunction with FIGS. 1a-1d.

The computer program 610 may be configured as a computer program code structured in computer program modules 610a-610e. Hence, in an exemplifying embodiment, the code means in the computer program of the arrangement 600 in the network node 500 comprises a determining unit, or module, for determining to employ splinted Link Adaptation, LA, for a downlink transmission on the SCell. The computer program further comprises an employing unit, or module, for employing a first MCS on one or more first subframes of a transmission burst to be transmitted to the one or more wireless device and at least a second MCS on one or more subsequent subframes of the transmission burst to be transmitted to the wireless device.

The computer program modules could essentially perform the actions of the flow illustrated in FIGS. 1a-1d, to emulate the network node 500 operable in the communication network. In other words, when the different computer program modules are executed in the processing unit 606, they may correspond to the units 503-504 of FIG. 5.

Although the code means in the respective embodiments disclosed above in conjunction with FIG. 5 is implemented as computer program modules which when executed in the processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node supporting carrier aggregation, for performing a transmission to one or more wireless devices, the method comprising:
   determining to employ splinted Link Adaptation (LA) for a downlink transmission on a Secondary Cell (SCell), wherein the network node provides a Primary Cell (PCell) in a licensed frequency band and the SCell in an unlicensed frequency band,
   employing a first Modulation and Coding Scheme (MCS) on one or more first subframes of a transmission burst to be transmitted to the one or more wireless devices and at least a second MCS on one or more subsequent subframes of the transmission burst to be transmitted to the one or more wireless devices, and
   transmitting the transmission burst to the one or more wireless devices on the SCell.

2. The method according to claim 1, wherein the first MCS on the one or more first subframes of the transmission burst is associated with a lower MCS index than the second MCS on the one or more subsequent subframes of the transmission burst.

3. The method according to claim 1, further comprising transmitting dummy data at least on the one or more first subframes of the transmission burst.

4. The method according to claim 1, further comprising determining the first MCS and the second MCS.

5. The method according to claim 4, wherein the determining the first MCS and the second MCS comprises the first MCS being fixed, and determining the second MCS based on an Outer Loop for the one or more subsequent subframes of the transmission burst and based on a reported channel quality.

6. The method according to claim 4, wherein the determining the first MCS and the second MCS comprises determining the second MCS based on an Outer Loop for the one or more subsequent subframes of the transmission burst and based on a reported channel quality, and determining the first MCS based on an offset to the second MCS.

7. The method according to claim 6, wherein the offset is being determined by an Outer Loop for at least one of the one or more first subframes of the transmission burst.

8. The method according to claim 6, wherein the offset is fixed.

9. The method according to claim 4, wherein the determining the first MCS and the second MCS comprises determining the first MCS based on an Outer Loop for the one or more first subframes of the transmission burst and based on a reported channel quality; and determining the second MCS based on an Outer Loop for the one or more subsequent subframes of the transmission burst and based on a reported channel quality.

10. The method according to claim 5, wherein the reported channel quality is represented by a Channel Quality Indicator (CQI).

11. A network node supporting carrier aggregation, operable to perform a transmission to one or more wireless devices, the network node comprising:
   a processor;
   the processor configured to determine to employ splinted Link Adaptation (LA) for a downlink transmission on a Secondary Cell (SCell), wherein the network node is operable in a wireless communication network and the network node provides a Primary Cell (PCell) in a licensed frequency band and the SCell in an unlicensed frequency band,
   the processor configured to employ a first Modulation and Coding Scheme (MCS) on one or more first subframes of a transmission burst to be transmitted to the one or more wireless devices and at least a second MCS on one or more subsequent subframes of the transmission burst to be transmitted to the one or more wireless devices, and
   the processor configured to transmit the transmission burst to the one or more wireless devices on the SCell.

12. The network node according to claim 11, wherein the first MCS on the one or more first subframes of the transmission burst is associated with a lower MCS index than the second MCS on the one or more subsequent subframes of the transmission burst.

13. The network node according to claim 11, wherein the processor is further configured to transmit dummy data at least on the one or more first subframes of the transmission burst.

14. The network node according to claim 11, wherein the processor is further configured to determine the first MCS and the second MCS.

15. The network node according to claim 14, wherein the processor is configured to determine the first MCS and the second MCS by the first MCS being fixed, and by determining the second MCS based on an Outer Loop for the one or more subsequent subframes of the transmission burst and based on a reported channel quality.

16. The network node according to claim 14, wherein the processor is configured to determine the first MCS and the second MCS by determining the second MCS based on an Outer Loop for the one or more subsequent subframes of the transmission burst and based on a reported channel quality, and determining the first MCS based on an offset to the second MCS.

17. The network node according to claim 16, wherein the offset is being determined by an Outer Loop for at least one of the one or more first subframes of the transmission burst.

18. The network node according to claim 16, wherein the offset is fixed.

19. The network node according to claim 14, wherein the processor is configured to determine the first MCS and the second MCS by determining the first MCS based on an Outer Loop for the one or more first subframes of the transmission burst and based on a reported channel quality, and determining the second MCS based on an Outer Loop for the one or more subsequent subframes of the transmission burst and based on a reported channel quality.

20. The network node according to claim 15, wherein the reported channel quality is represented by a Channel Quality Indicator (CQI).

21. A network node supporting carrier aggregation, for performing a transmission to one or more wireless devices, the network node comprising:
   a non-transitory computer-readable storage medium comprising computer readable code including instructions to cause at least one processing unit on the network node to:
   determine to employ splinted Link Adaptation (LA) for a downlink transmission on a Secondary Cell (SCell), wherein the network node provides a Primary Cell (PCell) in a licensed frequency band and the SCell in an unlicensed frequency band,
   employ a first Modulation and Coding Scheme (MCS) on one or more first subframes of a transmission burst to be transmitted to the one or more wireless devices and at least a second MCS on one or more subsequent subframes of the transmission burst to be transmitted to the one or more wireless devices, and
   transmit the transmission burst to the one or more wireless devices on the SCell.

* * * * *